(12) United States Patent
Andrews

(10) Patent No.: US 6,394,307 B1
(45) Date of Patent: May 28, 2002

(54) DETACHABLE RAILING SYSTEM

(76) Inventor: Rick L. Andrews, 1893 N. 1183 Rd., Eudora, KS (US) 66025

( * ) Notice: Subject to any disclaimer, the term of this patent is extended or adjusted under 35 U.S.C. 154(b) by 0 days.

(21) Appl. No.: 09/205,743

(22) Filed: Dec. 4, 1998

(51) Int. Cl.[7] .................................................. A24F 15/04
(52) U.S. Cl. ........................................ 221/186; 280/166
(58) Field of Search ................................. 280/166, 163, 280/656, 164.1; 296/162; 182/127, 96; 221/186, 188

(56) References Cited

U.S. PATENT DOCUMENTS

| | | |
|---|---|---|
| 5,280,934 A | 1/1994 | Monte |
| 5,397,143 A | 3/1995 | Bird ............................ 280/166 |
| 5,653,459 A | 8/1997 | Murphy ....................... 280/166 |

*Primary Examiner*—Kenneth W. Noland
(74) *Attorney, Agent, or Firm*—Joseph N. Breaux

(57) ABSTRACT

A railing system for a trailer or recreational vehicle that includes a handrail that is attachable to the wall structure of the vehicle adjacent to the entranceway to provide a stable support for individuals while entering and leaving. The handrail assembly is easily and rapidly attached and detached and includes a wall mount that is permanently attachable to the wall structure of the vehicle and an angularly adjustable handrail assembly that is detachably connectable to the wall mount.

3 Claims, 2 Drawing Sheets

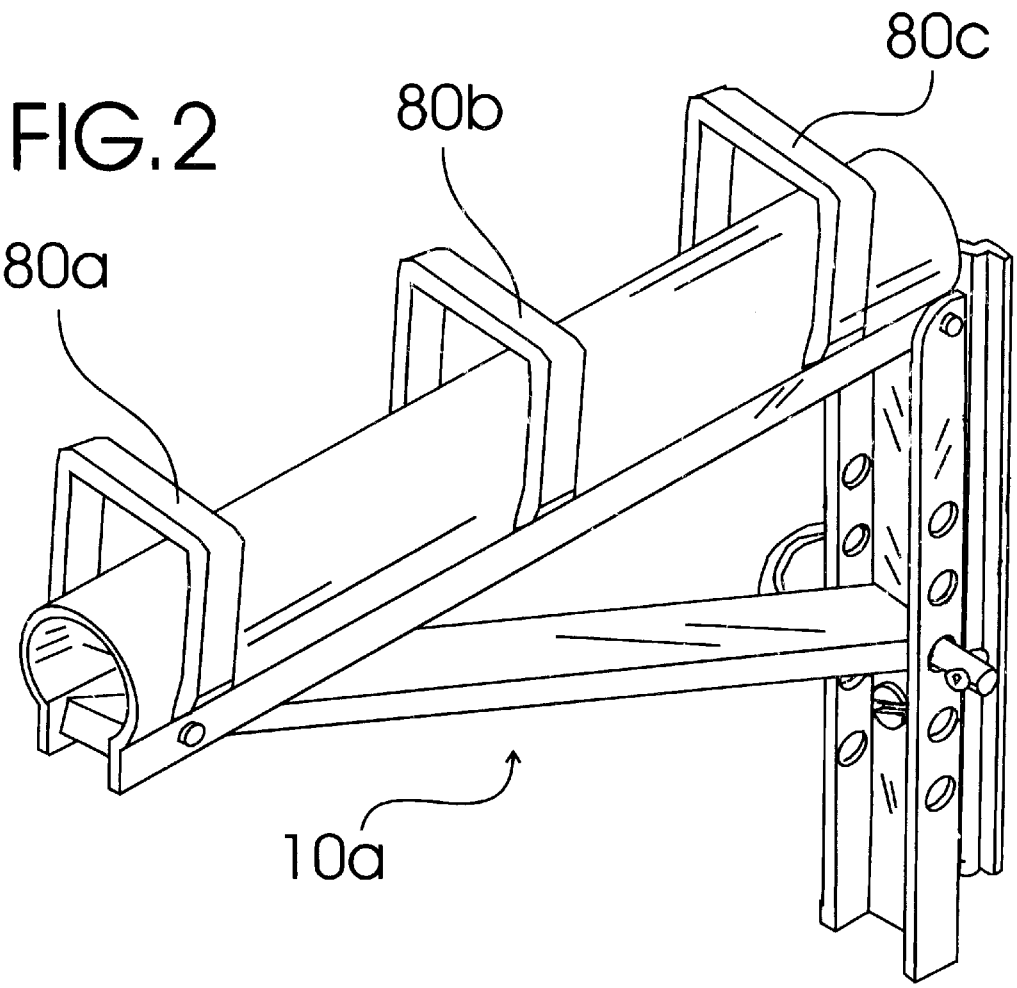

DETACHABLE RAILING SYSTEM

TECHNICAL FIELD

The present invention relates to safety railings and more particularly to a detachable railing system suitable for use on recreational vehicles and trailers to provide a stable railing that can be used by elderly and infirm individuals while climbing into and out of such vehicles and which can be detached while the trailer or recreational vehicle is being moved; the detachable railing system including a permanently attachable wall mount and an angularly adjustable handrail assembly that is detachably connectable to the wall mount; the wall mount having a raised center section, a plurality of attachment screw apertures, two locking keyway slots, and a threaded locking screw aperture; the handrail assembly including a mounting channel member, a support brace, a handrail member, a securing pin and a locking screw; the mounting channel member including a brace receiving channel defined between two parallel spaced sidewalls that are provided with pairs of concentrically aligned locking pin holes therethrough and a back wall having a channel defining surface through which a locking screw aperture is provided, the back wall having a back surface including a pair of spaced, enlarged ended locking keys that extend outwardly therefrom that are spaced and sized to engage and lock within the two locking keyways slots of the wall mount such that when the locking screw is positioned through the locking screw aperture and threaded into the threaded locking screw aperture of the wall mount, the locking keys are not disengagable from the two locking keyways slots; the hand rail member being elongated, rigid, and pivotally connected at a first handrail end to a top end of the mounting channel member and pivotally connected at a second handrail end to the support brace; the support brace having a moveable end positionable into the brace receiving channel of the mounting channel member and a securing pin aperture provided through the moveable end that is selectively alignable with each of the pairs of concentrically aligned locking pin holes; the securing pin being positionable through the securing pin aperture and one pair of the aligned pairs of concentrically aligned locking pin holes to secure the moveable end of the support brace to the mounting channel member; the angle of the handrail member with respect to the mounting channel member being user selectable by alignment of the securing pin aperture with a pair of concentrically aligned locking pin holes that corresponds to the desired handrail angle prior to insertion of the securing pin therethrough.

BACKGROUND ART

Recreational vehicles and trailers are typically raised and can only be entered and exited by steps, stairways or the like. Many of these vehicles do not provide a stable handrail to assist individuals while entering or leaving. It would be a benefit, therefore, to have a handrail system for trailers and recreational vehicles that could be attached to the wall structure of the vehicle adjacent to the entranceway to provide a stable support for individuals while entering and leaving. Because the handrail extends outwardly from the side of the vehicle, it should be removed before the recreational vehicle or trailer is moved. It would be a further benefit, therefore, to have a detachable rail system that included a handrail assembly that is easily and rapidly attached and detached.

GENERAL SUMMARY DISCUSSION OF INVENTION

It is thus an object of the invention to provide a railing system for a trailer or recreational vehicle that includes a handrail that is attachable to the wall structure of the vehicle adjacent to the entranceway to provide a stable support for individuals while entering and leaving.

It is a further object of the invention to provide a detachable railing system that includes a handrail assembly that is easily and rapidly attached and detached.

It is a still further object of the invention to provide a detachable railing system that includes a wall mount and an angularly adjustable handrail assembly that is detachably connectable to the wall mount; the wall mount having a raised center section, a plurality of attachment screw apertures, two locking keyway slots, and a threaded locking screw aperture; the handrail assembly including a mounting channel member, a support brace, a handrail member, a securing pin and a locking screw; the mounting channel member including a brace receiving channel defined between two parallel spaced sidewalls that are provided with pairs of concentrically aligned locking pin holes therethrough and a back wall having a channel defining surface through which a locking screw aperture is provided, the back wall having a back surface including a pair of spaced, enlarged ended locking keys that extend outwardly therefrom that are spaced and sized to engage and lock within the two locking keyways slots of the wall mount such that when the locking screw is positioned through the locking screw aperture and threaded into the threaded locking screw aperture of the wall mount, the locking keys are not disengagable from the two locking keyways slots; the hand rail member being elongated, rigid, and pivotally connected at a first handrail end to a top end of the mounting channel member and pivotally connected at a second handrail end to the support brace; the support brace having a moveable end positionable into the brace receiving channel of the mounting channel member and a securing pin aperture provided through the moveable end that is selectively alignable with each of the pairs of concentrically aligned locking pin holes; the securing pin being positionable through the securing pin aperture and one pair of the aligned pairs of concentrically aligned locking pin holes to secure the moveable end of the support brace to the mounting channel member; the angle of the handrail member with respect to the mounting channel member being user selectable by alignment of the securing pin aperture with a pair of concentrically aligned locking pin holes that corresponds to the desired handrail angle prior to insertion of the securing pin therethrough.

It is a still further object of the invention to provide a detachable railing system that accomplishes some or all of the above objects in combination.

Accordingly, a detachable railing system is provided. The detachable railing system includes a wall mount and an angularly adjustable handrail assembly that is detachably connectable to the wall mount; the wall mount having a raised center section, a plurality of attachment screw apertures, two locking keyway slots, and a threaded locking screw aperture; the handrail assembly including a mounting channel member, a support brace, a handrail member, a securing pin and a locking screw; the mounting channel member including a brace receiving channel defined between two parallel spaced sidewalls that are provided with pairs of concentrically aligned locking pin holes therethrough and a back wall having a channel defining surface through which a locking screw aperture is provided, the back wall having a back surface including a pair of spaced, enlarged ended locking keys that extend outwardly therefrom that are spaced and sized to engage and lock within the two locking keyways slots of the wall mount such that when the locking screw is positioned through the locking screw aperture and threaded into the threaded locking screw aperture of the wall mount, the locking keys are not disengagable from the two locking keyways slots; the hand rail member being elongated, rigid, and pivotally connected at a first handrail end to a top end of the mounting channel member and pivotally connected at a second handrail end to the support brace; the support brace having a moveable end positionable into the brace receiving channel of the mounting channel member and a securing pin aperture provided through the moveable end that is selectively alignable with each of the pairs of concentrically aligned locking pin holes; the securing pin being positionable through the securing pin aperture and one pair of the aligned pairs of concentrically aligned locking pin holes to secure the moveable end of the support brace to the mounting channel member; the angle of the handrail member with respect to the mounting channel member being user selectable by alignment of the securing pin aperture with a pair of concentrically aligned locking pin holes that corresponds to the desired handrail angle prior to insertion of the securing pin therethrough. In a preferred embodiment the handrail member includes a number of hand grips that are spaced along and extend outwardly from the handrail member to provide a secure hand gripping structure for weak and infirm individuals. The hand grips are preferably U-shaped.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 2 is a perspective view of a second exemplary embodiment of the detachable handrail system of the present invention that is identical in all respects to the embodiment shown in FIG. 1 except three U-shaped hand grips are spaced along and extend outwardly from the handrail member to provide a secure hand gripping structure for weak and infirm individuals.

EXEMPLARY MODE FOR CARRYING OUT THE INVENTION

Figure 1:
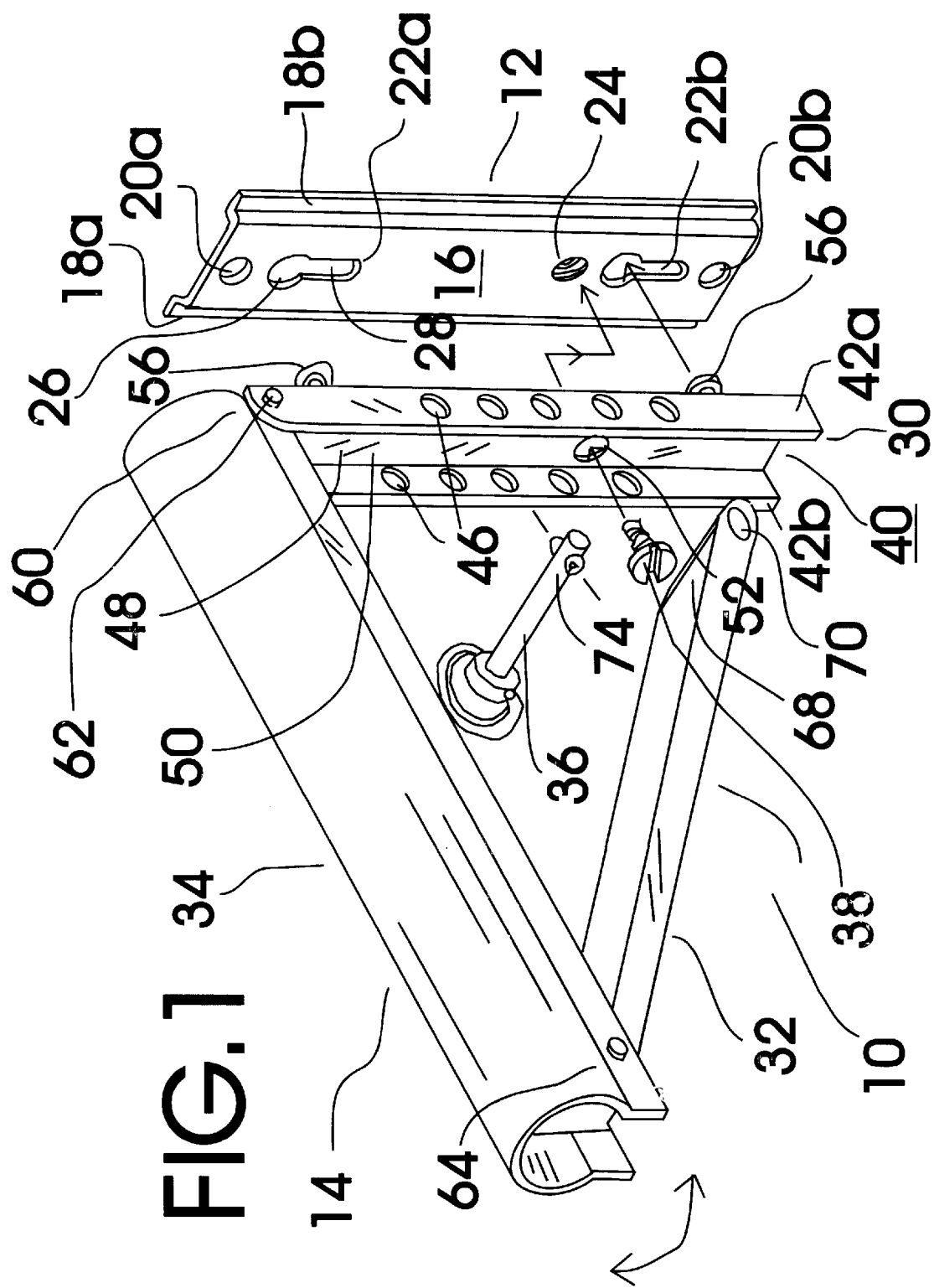
FIG. 1 is a perspective view of an exemplary embodiment of the detachable railing system of the present invention showing the wall mount with the raised center section, the two attachment screw apertures, the two locking keyway slots, and the threaded locking screw aperture; the handrail assembly including the mounting channel member including a brace receiving channel defined between two parallel spaced sidewalls that are provided with pairs of concentrically aligned locking pin holes therethrough and a back wall having a channel defining surface through which a locking screw aperture is provided and a back surface having a pair of spaced locking keys extend outwardly therefrom that are spaced and sized to engage and lock with the two locking keyways slots of the wall mount such that a screw positioned through the locking screw aperture and threaded into the threaded locking screw aperture of the wall mount prevents the locking keys from disengaging from the two locking keyways slots; the handrail assembly further including a hand rail member pivotally connected at a first handrail end to a top end of the mounting channel member and pivotally connected at a second handrail end to a support brace; the support brace having a moveable end positionable into the brace receiving channel of the mounting channel member and having a securing pin aperture selectively alignable with each of the pairs of concentrically aligned locking pin holes; a securing pin being positionable through the securing pin aperture and an aligned pair of concentrically aligned locking pin holes to secure the moveable end of the support brace to the mounting channel member; the angle of the handrail member with respect to the mounting channel member being selectable by selection of and alignment of the securing pin aperture with a pair of concentrically aligned locking pin holes that corresponds to the desired handrail angle.

FIG.1 shows an exemplary embodiment of the detachable railing system of the present invention generally designated 10. Detachable railing system 10 includes a stamped metal wall mount, generally designated 12; and a handrail assembly, generally designated 14. Wall mount 12 includes a raised center section 16 and two side edge section 18a,18b that support raised center section 16 away from the wall structure to which wall mount 12 is to be attached. Center section 16 has two attachment screw apertures 20a,20b; two locking keyway slots 22a,22b; and a threaded locking screw aperture 24. Locking keyway slots 22a,22b each have a large diameter insertion opening 26 and a thinner diameter locking slot 28.

Handrail assembly 14 includes a mounting channel member, generally designated 30; a support brace, generally designated 32; a handrail member, generally designated 34; a securing pin, generally designated 36; and a locking screw 38. Mounting channel member 30 is formed from steel and includes a brace receiving channel 40 defined between two parallel spaced sidewalls 42a,42b that are provided with pairs of concentrically aligned locking pin holes 46 therethrough and a back wall 48 having a channel defining surface 50 through which a locking screw aperture 52 is provided. Back wall 48 also has a back surface opposite the channel defining surface that has a pair of spaced, expanded end locking keys 56 that extend outwardly therefrom and that are spaced and sized to engage and lock with the two locking keyways slots 22a,22b of wall mount 12 such that when locking screw 38 is positioned through locking screw aperture 52 and threaded into threaded locking screw aperture 24 of wall mount 12, locking keys 56 are not disengagable from locking keyway slots 22a,22b. However, once locking screw 38 is removed, locking keys 56 are easily disengaged from locking keyway slots 22a,22b to remove handle assembly 14 when required.

Hand rail member 34 is of rigid metal construction and is pivotally connected at a first handrail end 60 to a top end 62 of mounting channel member 30 and pivotally connected at a second handrail end 64 to support brace 32. Support brace 32 is of rigid metal construction and has a moveable end 68 that is positionable into brace receiving channel 40 of mounting channel member 30 and has a securing pin aperture 70 that is selectively alignable by the user with each of the pairs of concentrically aligned locking pin holes 46. Securing pin 36 has a shaft 74 that is positionable through securing pin aperture 70 and a user selected aligned pair of concentrically aligned locking pin holes 46 to secure moveable end 68 of support brace 32 to mounting channel member 30 holding hand rail member 34 at a fixed angle with respect to mounting channel member 30. The angle of handrail member 34 with respect to mounting channel member 30 is selectable by selection of and alignment of securing pin aperture 70 with a pair of concentrically aligned locking pin holes 46 that corresponds to the desired handrail angle.

FIG. 2 shows a second exemplary embodiment of the detachable handrail system of the present invention, generally designated 10a. Detachable handrail system 10 is identical in all respects to the detachable handrail system 10 of FIG. 1 except three U-shaped, metal hand grips 80a,80b,80c are spaced along and extend outwardly from handrail member 34 to provide a secure hand gripping structure for weak and infirm individuals.

It can be seen from the preceding description that a railing system for a trailer or recreational vehicle has been provided that includes a handrail that is attachable to the wall structure of the vehicle adjacent to the entranceway to provide a stable support for individuals while entering and leaving; that includes a handrail assembly that is easily and rapidly attached and detached; and that includes a wall mount and an angularly adjustable handrail assembly that is detachably connectable to the wall mount; the wall mount having a raised center section, a plurality of attachment screw apertures, two locking keyway slots, and a threaded locking screw aperture; the handrail assembly including a mounting channel member, a support brace, a handrail member, a securing pin and a locking screw; the mounting channel member including a brace receiving channel defined between two parallel spaced sidewalls that are provided with pairs of concentrically aligned locking pin holes therethrough and a back wall having a channel defining surface through which a locking screw aperture is provided, the back wall having a back surface including a pair of spaced, enlarged ended locking keys that extend outwardly therefrom that are spaced and sized to engage and lock within the two locking keyways slots of the wall mount such that when the locking screw is positioned through the locking screw aperture and threaded into the threaded locking screw aperture of the wall mount, the locking keys are not disengagable from the two locking keyways slots; the hand rail member being elongated, rigid, and pivotally connected at a first handrail end to a top end of the mounting channel member and pivotally connected at a second handrail end to the support brace; the support brace having a moveable end positionable into the brace receiving channel of the mounting channel member and a securing pin aperture provided through the moveable end that is selectively alignable with each of the pairs of concentrically aligned locking pin holes; the securing pin being positionable through the securing pin aperture and one pair of the aligned pairs of concentrically aligned locking pin holes to secure the moveable end of the support brace to the mounting channel member; the angle of the handrail member with respect to the mounting channel member being user selectable by alignment of the securing pin aperture with a pair of concentrically aligned locking pin holes that corresponds to the desired handrail angle prior to insertion of the securing pin therethrough.

It is noted that the embodiment of the detachable railing system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A detachable railing system comprising:

a wall mount; and an angularly adjustable handrail assembly that is detachably connectable to said wall mount;

said wall mount having a raised center section, a plurality of attachment screw apertures, two locking keyway slots, and a threaded locking screw aperture;

said handrail assembly including a mounting channel member, a support brace, a handrail member, a securing pin and a locking screw;

said mounting channel member including a brace receiving channel defined between two parallel spaced sidewalls that are provided with pairs of concentrically aligned locking pin holes therethrough and a back wall having a channel defining surface through which a locking screw aperture is provided, said back wall having a back surface including a pair of spaced, enlarged ended locking keys that extend outwardly therefrom that are spaced and sized to engage and lock within said two locking keyways slots of said wall mount such that when said locking screw is positioned through said locking screw aperture and threaded into said threaded locking screw aperture of said wall mount, said locking keys are not disengagable from said two locking keyways slots;

said hand rail member being elongated, rigid, and pivotally connected at a first handrail end to a top end of said mounting channel member and pivotally connected at a second handrail end to said support brace;

said support brace having a moveable end positionable into said brace receiving channel of said mounting channel member and a securing pin aperture provided through said moveable end that is selectively alignable with each of said pairs of concentrically aligned locking pin holes;

said securing pin being positionable through said securing pin aperture and one pair of said aligned pairs of concentrically aligned locking pin holes to secure said moveable end of said support brace to said mounting channel member;

said angle of said handrail member with respect to said mounting channel member being user selectable by alignment of said securing pin aperture with a pair of concentrically aligned locking pin holes that corresponds to said desired handrail angle prior to insertion of said securing pin therethrough.

2. The detachable railing system of claim 1 wherein:

said handrail member includes a number of hand grips that are spaced along and extend outwardly from said handrail member to provide a secure hand gripping structure to individuals.

3. The detachable railing system of claim 2 wherein:

said hand grips are U-shaped.

* * * * *